UNITED STATES PATENT OFFICE.

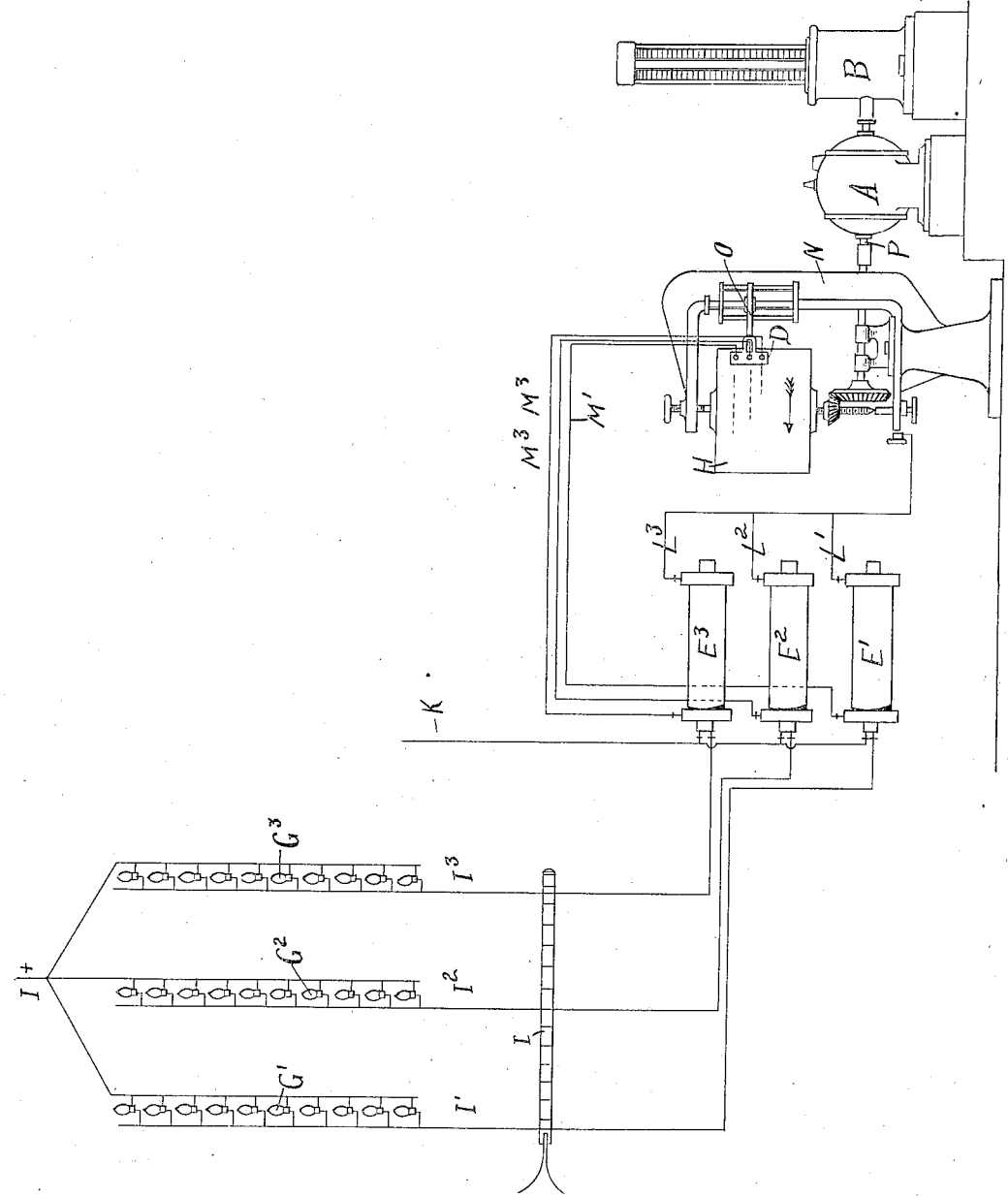

HANS FRIEDRICH METTEGANG, OF SCHLEBUSCH, GERMANY.

DETONATING-VELOCITY RECORDER.

No. 916,572.　　　　Specification of Letters Patent.　　Patented March 30, 1909.

Application filed February 9, 1906. Serial No. 300,333.

*To all whom it may concern:*

Be it known that I, HANS FRIEDRICH METTEGANG, subject of the German Empire, residing at Schlebusch, Germany, have invented new and useful Improvements in Detonating-Velocity Recorders, of which the following is a specification.

In particular my invention relates to that kind of electro-chronographic apparatus, in which, by the combination of a spark-inductor with an isochronally moved drum or paper-strip and other parts, small intervals of time, as in particular combustion or detonation-periods, are graphically recorded by rows of blank points produced on the soot-covered or otherwise prepared surface of the said drum or strip.

The object of my invention is to realize—by the combination of a plurality of spark-inductors with a drum- or strip-indicator and a detonation - controlled inductor - circuit-breaker or weakener (both) of accordingly modified construction—the electro-chronographic determination of very small intervals of time like combustion or detonation-velocities by means of recording on the indicator - drum or strip a plurality of point-rows which are distant one from the other in the direction of the height of the indicator-drum or the width of the recording-strip. By such new constructional measures and corresponding new electro-chronographic method it is made possible to determine combustion or detonation-velocities with a precision and reliability which is much superior to the effect realized by the use of electro-magnetic chronographs (of the Leboulangé-type or the like), in which the moment of demagnetization or falling of the recording armature never exactly coincides with the moment of the interruption or weakening of the electro-magnet-circuit produced in dependence from the beginning or end of the detonation and by far superior also to results obtained with spark-inductor-apparatus (of the Siemens type and others similar to it), which contain only one spark - inductor producing only one line of recording points and in which the periods of weakening or breaking of the primary inductor-circuit, *id est* the beginning or ending of the detonation, are not always distinctly marked.

Referring to the annexed drawing showing a front-view of a preferred constructional form of the electro-chronographic apparatus embodying the present invention, I and K are electrical conductors which are branched from an existing wire-system serving for instance for electric lighting.

$G^1$, $G^2$, $G^3$ are three series of electric incandescent lamps which are disposed as resistance-means (in order to reduce the tension which is usually employed for electric lighting, which, however, is too high for an electro-chronograph as represented on the drawing). To the said lamp-rows the electric energy is supplied by means of the shown wires branched from the main conductor I; and with the other wires $I^1$, $I^2$, $I^3$ departing from the said lamp-rows connection is made with the exploding tube F containing the cartridges filled with the explosive substance or mixture the combustion-velocity of which is to be determined. The priming of said cartridges is progressively effected in any known way avoiding intervals between consecutive detonations *id est* preferably by means of electric sparks.

By the detonation of the cartridges which are to be tested interruption or weakening is successively produced in the branch-circuits which are formed in departure from the exploding-tube-wires $I^1$, $I^2$, $I^3$ in such a manner that they include the primary coils of the three represented spark-inductors $E^1$, $E^2$, $E^3$, which, of course, are made without magnet-cores, the wire-connection of the said primary coils with the second main conductor K being clearly shown on the drawing. From the secondary coils of the spark-inductors $E^1$, $E^2$, $E^3$ are branched out the wires $L^1$, $L^2$, $L^3$ and $M^1$, $M^2$, $M^3$. The first-said of these wires are connected to the sparking-points D, while the last-said are attached to the indicator-frame N, so that by said wires current is always fed also to the metallic drum C which is carried by the said frame by means of journals permitting of its easy rotation, as it is known from other electro-chronographs. O is an arm carried by the frame N, the vertical position of which may be varied by means of an adjusting screw-spindle and to which are secured the sparking points D, the connection of which to the secondary coils of the spark-inductors by means of the wires $L^1$, $L^2$, $L^3$ has already been mentioned. Each of the three sparking points is made and fixed upon an end-plate of the arm O in any known manner which permits of more or less approaching the sparking-points toward the drum C with the necessary precision. For the purpose of producing the rotation of the drum C, the uniformity of which is a known necessity, an electro-motor A is shown in the general disposition *exempli gratia* given on the annexed drawing. The shaft P of the armature of said motor A is coupled, as shown, to a spindle journaled in the frame N, and from this spindle the driving movement is transmitted to the axis of the indicating drum by means of bevel-wheel-gearing. To make possible a permanent exact control of the uniformity of the drum-rotation the motor A is shown connected with a bifluid-tachometer B, the driving spindle of which is directly coupled to the right projecting end of the motor-shaft P.

In general the function and operation of the improved electrode-chronograph having the afore-stated main constructional features are the following: In proportion as the cartridges to be tested are progressively subjected to the detonation, an interruption or weakening effect is produced in the current flowing through the primary coils of the spark-inductors $E^1$, $E^2$, $E^3$. In consequence a corresponding influence being exerted also upon the current emanating from the secondary coils of the spark-inductors, *id est* the increase of tension necessary for causing the spark to traverse the sparking gap between the points D and the drum C being produced, on the latter three rows of blank points, as shown for instance on the drawing at H, are formed, such rows being distanced from each other in vertical direction. Thus a graphic record of the detonation-velocity is obtained, the accuracy of which is by far superior to the quality of the records obtainable by the use of known spark-inductor-chronographs on account of the following two facts:

Firstly the formation (with regard to the recording-progress) of transverse distances between the point-rows resulting from the use of three spark-inductors in combination with three sparking points enables the tester to read from the indicator-drum the exact beginning and end of the graphic equivalent of the combustion-periods, such accurate measurement being rarely realized when known spark-inductor-chronographs are used, on the drums of which the rows of points are recorded in one and the same circumferential or not step-forming line. It is known that such imperfect recording is caused by the fact that between two series of recording-points electrically produced in one circumferential line the space which is intended to indicate the end and beginning of the detonation phases is often imperfectly marked or completely effaced, since between the moment of the interruption or weakening of the primary current and the moment in which thereby the tension in the secondary circuit is sufficiently increased for the flashing of the spark across the sparking gap there is an interval of time, which, in fact, though being very small, is sufficiently great to disturb or falsify the point-record of the combustion velocities which are to be measured.

Secondly the improved electro-chronographic recording effect obtained according to the present invention is considerably dependent also from the fact that a fairly high voltage can be used for the primary inductor-current and that the sparking points can be brought to a very short distance from the indicating drum, whereby each of the three point-diagrams traced one beneath the other are obtained of fair length and distinctness. The same conditions, when established in known chronographs having only one spark-inductor, are prejudicious or not available at all, inasmuch as, in measuring exceedingly small intervals of time like detonation-periods, the rigorous space between two consecutive rows of points often does not produce itself, as the last points of one row prove to be covered by the points of the beginning of the following row. To the different chronographic old and new effects exposed in the foregoing correspond on an average the following point records:

Three-inductor-chronograph embodying the present invention:

................
................
................

Single-inductor-chronograph of the Siemens type or the like:

Desired rigorous diagram of two point-rows ...... ........
Continuous false record of the same diagram ........

Now, to give a complete idea of the invention-matter, it appears convenient to explain also a particular case of the application and function of the electrochronograph affecting the general constructional and functional features as stated in the foregoing. In order to render more intelligible and more simple such particular explanations we assume for instance the conditions shown on the annexed drawing. Thus in particular it may be supposed that 13 cartridges are introduced into the exploding tube F and are to be tested in order to determine the velocity of the combustion of their charge.

It may be imagined that—after having introduced into the exploding tube F the 13 cartridges the combustion velocity of which is to be tested—the above-mentioned connection between the wires $I^1$, $I^2$, $I^3$ and the said cartridges may be effected by three thin and rigid wires, which we call "registering needles" as forming the firstly acting transmitting means for the graphic record and which are disposed in such a manner that they pass for instance across the exploding tube F at the middles of the 1st, 7th and 13th cartridges, as it is shown on the drawing. It is obvious that the said tube must be accordingly provided, for the penetration of the registering needles, with 6 fine holes which, in couples, are diametrically opposed one to the other and in which the registering needles are engaged as tightly as possible. Moreover it is evident that all the cartridges submitted to trial must have a certain uniform length or charge, so that, when they are introduced, in the number of 13, into the said exploding tube provided with the six needle-holes, the middles of the 1st, 7th and 13th cartridge are in perfect opposition to the afore-said couples of holes, that is to say that the needles engaged into these holes penetrate the three recording-cartridges at or near the bisection points of their length as it is approximately shown also on the drawing. If such bisectional penetration of the critical cartridges is not to be realized, it is necessary at least for an exact recording result that the said cartridges are traversed by the registering needles at a uniform distance from their front or back end-faces.

Now we suppose that the trial-cartridges are ignited from the first at the left side, to that effect electrical igniting or exploding wires being introduced into the free end of the said first cartridge or close by that end, as it is represented also on the drawing at the left end of the exploding tube ("left" being said in the sense of a person viewing the drawing).

The ignition of the first trial-cartridge reaching also all the other cartridges with great velocity, during the lapse of several fractional parts of a second the combustion or explosion of all the 13 cartridges will take place in the exploding tube F. It is in a quite mechanical way, that is by fusion or rupture caused by the heat or the vehemence of the explosion, that the three registering needles engaged into the 1st, 7th and 13th cartridge are destroyed one after the other and that in accordance the electric current arriving from the wires $I^1$, $I^2$, $I^3$ is intercepted in its way to the primary coils of the inductors $E^1$, $E^2$, $E^3$, by such interruption the induction sparks being correspondingly caused to flash at the interruption points of the wires $L^1$, $L^2$, $L^3$ and $M^1$, $M^2$, $M^3$ conducting the induced current from the secondary coils of the inductors. The said interruption points are constituted, as it is already stated in the general part of this specification, by the minute intervals formed between the metallic recording drum C, covered with soot or with a diagram-paper-sheet, and the sparking points D.

As to the particular conditions of electric connection they are preferably established and made use of in accordance with the drawing because all diagrams of the questionable kind are usually read from top to foot, so that the highest point D is in connection with $M^1$, that of the middle with $M^2$ and the lowest with $M^3$, while, for the rest, the indices of the reference letters are apposed in ascending order from left to right and from bottom to top.

Now it must be duly remembered that before the beginning of an electrochronographic measuring experiment an isochronical rotation is always imparted to the drum C of a certain great speed determined by trial or experience. By such rotation it is effected that the blank trace produced in the soot-coating of the drum C by a spark flashing against the same from one of the sparking points D is elongated and cannot form, in consequence a single dot. Thus the said trace is rather constituted by a series of dots or points and cannot assume the form of a line of a certain small length, because, as it is known, the induction sparks oscillate or flicker, so to speak, without exception, such unsteadiness being a phenomenon due to the nature of their formation. Moreover it is obvious also, that the three rows of dots which are recorded on the drum C one below the other must be produced one after the other; for it is easily to be understood that firstly the induction spark is produced in the lowest inductor $E^1$, as the first recording needle destroyed after the ignition is that which is connected to the wire $I^1$ and put across the first trial cartridge, and the destruction of which causes, by means of the conducting wires $L^1$ $M^1$, the passage of the said spark from the highest point D to the drum C. Now, if the diagram represented on the drum C is approximately exact there is still a certain reason for the question why, according to the conditions shown on the drawing, the recording of the middle row of dots may have already begun before the uppermost dot-row is finished and why the same relationship is to be stated with regard to the undermost and median row of dots. The answer to such question is the following: The interval lying between the destruction of the 1st and 7th or between the 7th and 13th cartridge is shorter or can be shorter than the space of time during which the discharge of sparks takes place at each of the inductors from the moment on which the primary current fed to the said inductors is interrupted. Practically this lapse of time is depending also on the quality of the manufacture of the inductor, whereby, as it is known, considerable influence is exerted also on the immediate starting of the secondary current, a fact bearing more or less also on the electrochronographic recording results. Moreover it may be stated also that the entire course or formation of the dot-rows, that is to say their right-hand or terminal part, is of little interest for the recording result. It is essential only to obtain a distinct and exact graphic determination of the initial or starting (left-hand) portion of the three rows of points viz. of the relative distance of the initial ends of the said three graphic notations, such initial recording result being realized in the electrochronograph embodying the present invention to a degree of perfection which renders entirely impossible the confusion of the divisional diagrams as being recorded one below the other. As to the said distance of the initial points of the divisional diagrams it is evidently to be understood in the sense of the rotation of the drum C, and if it is supposed for instance that 1 millimeter of the peripheral advance of the said drum (moving isochronally as it has already been stated) corresponds to an interval of $a$ seconds, and if it is furthermore supposed that in the diagram the distance of the left ends of the uppermost and middle recording trace has been determined to be $x$ millimeters and that the analogous end-distance between the middle and the undermost recording trace is measured to be $y$ millimeters, the average amount of the combustion time $t$ of one of $n$ cartridges introduced into the exploding barrel F is calculated to be $$t = \frac{xa + ya}{n-1} \text{ seconds.}$$

In the case of $x=y$ this formula is simplified to $$t = \frac{2xa}{n-1} \text{ seconds.}$$

The chronometric result obtained in this manner by means of the present invention may easily be recognized as being very exact and reliable to a degree never attained by the use of other apparatus which have been constructed hitherto for the same purpose.

It is obvious that all dispositions and constructive details explained in the foregoing about the improved chronograph may be modified in any possible way, provided that such alterations do not essentially interfere with the functional features of the new differential recording method. In this regard it may be particularly stated that, instead of disposing three inductors, more or only two may be established, to such modified number of inductors of course all other depending or coöperating parts being adapted in accordance.

Having thus described my invention what I claim as new and desire to secure by Letters Patent is:

In an apparatus for electrically measuring the detonation-velocity of explosives the combination with an isochronally moved recording surface support, of a plurality of spark inductors subject to the detonation of the explosives to be tested and of a corresponding plurality of sparking points marking a plurality of blank point-rows distant one from the other in a sense transverse to the length of such rows.

In testimony whereof I have signed my name to this specification in the presence of two subscribing witnesses.

HANS FRIEDRICH METTEGANG.

Witnesses:
WILLIAM ESSENWEIN,
PETER LIEBER.